United States Patent
Oman et al.

(10) Patent No.: US 7,778,186 B2
(45) Date of Patent: Aug. 17, 2010

(54) FAULT TOLERANT VEHICLE COMMUNICATION AND CONTROL APPARATUS

(75) Inventors: Todd P. Oman, Greentown, IN (US); Craig A. Tieman, Westfield, IN (US); Michel F. Sultan, Troy, MI (US); Dale L. Partin, Troy, MI (US); Clayton L. Nicholas, Indianapolis, IN (US)

(73) Assignee: Delphi Technologies, Inc., Troy, MI (US)

( * ) Notice: Subject to any disclaimer, the term of this patent is extended or adjusted under 35 U.S.C. 154(b) by 184 days.

(21) Appl. No.: 12/221,183

(22) Filed: Jul. 31, 2008

(65) Prior Publication Data

US 2009/0096576 A1 Apr. 16, 2009

Related U.S. Application Data

(63) Continuation-in-part of application No. 11/973,716, filed on Oct. 10, 2007, and a continuation-in-part of application No. 12/150,872, filed on May 1, 2008.

(51) Int. Cl.
*H04J 11/16* (2006.01)
*H01H 9/02* (2006.01)
*H04Q 1/00* (2006.01)
*G08C 9/02* (2006.01)

(52) U.S. Cl. ............ 370/241; 340/5.22; 340/5.72; 340/825.69; 701/211; 701/213

(58) Field of Classification Search .............. 340/5.1, 340/5.22, 5.62, 5.64, 5.72, 426.13, 426.15, 340/426.35, 426.17, 825.69; 701/200–226
See application file for complete search history.

(56) References Cited

U.S. PATENT DOCUMENTS

| 7,042,342 | B2 * | 5/2006 | Luo et al. ............ 340/426.17 |
| 7,328,103 | B2 * | 2/2008 | McCarthy et al. .......... 701/213 |
| 2006/0052140 | A1 * | 3/2006 | Hicks, III ............... 455/569.1 |
| 2006/0091997 | A1 | 5/2006 | Conner et al. |
| 2006/0114100 | A1 | 6/2006 | Ghabra et al. |
| 2006/0145810 | A1 * | 7/2006 | Buccinna et al. .......... 340/5.72 |
| 2006/0222120 | A1 | 10/2006 | Yegin et al. |
| 2007/0085656 | A1 | 4/2007 | Tang et al. |
| 2007/0162229 | A1 | 7/2007 | McCarthy et al. |

* cited by examiner

*Primary Examiner*—Afsar M. Qureshi
(74) *Attorney, Agent, or Firm*—Jimmy L. Funke

(57) ABSTRACT

Medium-range and global network information and control for a vehicle is achieved with a portable wireless key fob, a user-provided nomadic device, and a vehicle-installed telematics unit including a medium-range RF transceiver and a wireless network transceiver. The fob includes a medium-range RF transceiver for bi-directional communication with the telematics unit, and a short-range wireless transceiver for bi-directional communication with the nomadic device. The fob communicates with the telematics unit in a conventional manner, and also relays information between the telematics unit and the nomadic device. If a communication initiated via the fob cannot be completed because the fob is out of range, the communication is sent to the nomadic device for network transmission to the telematics unit. If a communication initiated via the nomadic device cannot be completed due to inadequate signal reception, the communication is sent to the fob for RF transmission to the telematics unit.

5 Claims, 4 Drawing Sheets

FAULT TOLERANT VEHICLE COMMUNICATION AND CONTROL APPARATUS

RELATED APPLICATIONS

This is a continuation-in-part of co-pending U.S. patent application Ser. Nos. 11/973,716, filed Oct. 10, 2007, and 12/150,872, filed May 1, 2008, which applications are assigned to the assignee of the present invention.

TECHNICAL FIELD

The present invention relates to remote communication and control for a vehicle, and more particularly to a fault tolerant apparatus utilizing a wireless key fob, a user-carried wireless nomadic device, and a vehicle-installed telematics unit.

BACKGROUND OF THE INVENTION

Various communication devices have been used to enable remote access and control of a motor vehicle. For example, short-range and medium-range wireless RF communication devices have been used to activate door locks, to start the engine, to access vehicle status information, and so forth. The communication device can be in the form of a so-called "smart key fob" or a nomadic device (such as a cell phone or PDA) equipped with an RF transceiver in the form of a SDIO card for example, as described in the U.S. Pat. No. 7,224,262 to Simon et al. Another approach, described for example in the U.S. Pat. No. 6,970,703 to Fuchs et al., is to configure both the vehicle and the user-borne nomadic device for both short-range RF communication and global network communication. In that case, the short-range RF communication link is used for remote access and control if the nomadic device is within a prescribed range of the vehicle; and otherwise, the global network communication link is used.

The above-described approaches all have significant drawbacks. For example, smart key fobs tend to be both too large and too expensive when human-machine interface (HMI) devices such as keypads and displays are integrated into the fob. And localizing all of the vehicle information and control functionality into a single special-purpose nomadic device is also undesirable because many users frequently change nomadic devices as new styles, features and functions become available, and because all functionality is lost if the nomadic device is lost or fails, or has a discharged battery. Accordingly, what is needed is an improved and lower-cost way of achieving both medium-range and long-range communication and control for a vehicle.

SUMMARY OF THE INVENTION

The present invention is directed to an improved wireless communication system that provides both medium-range and long-range communication and control for a vehicle with a portable wireless key fob, an user-provided wireless nomadic device, and a vehicle-installed telematics unit that includes both a medium-range wireless RF transceiver and a global wireless network transceiver. The portable fob includes a medium-range wireless RF transceiver for bi-directional communication with the telematics unit, and a short-range wireless transceiver for bi-directional communication with the user's nomadic device. The fob communicates with the telematics unit in a conventional manner, and also relays information between the telematics unit and the user's nomadic device.

Communications can be initiated by the telematics unit or by the user via the fob or nomadic device. If a command or data request communication initiated via the fob cannot be completed because the fob is not within RF range of the telematics unit, the fob signals the nomadic device via its short-range communication link to initiate a global network communication for relaying the command or request to the telematics unit. If a command or data request communication initiated via the nomadic device cannot be completed due to inadequate network signal reception, the nomadic device signals the fob via its short-range communication link to initiate an RF communication for relaying the command or request to the telematics unit.

DESCRIPTION OF THE PREFERRED EMBODIMENT

Figure 1:
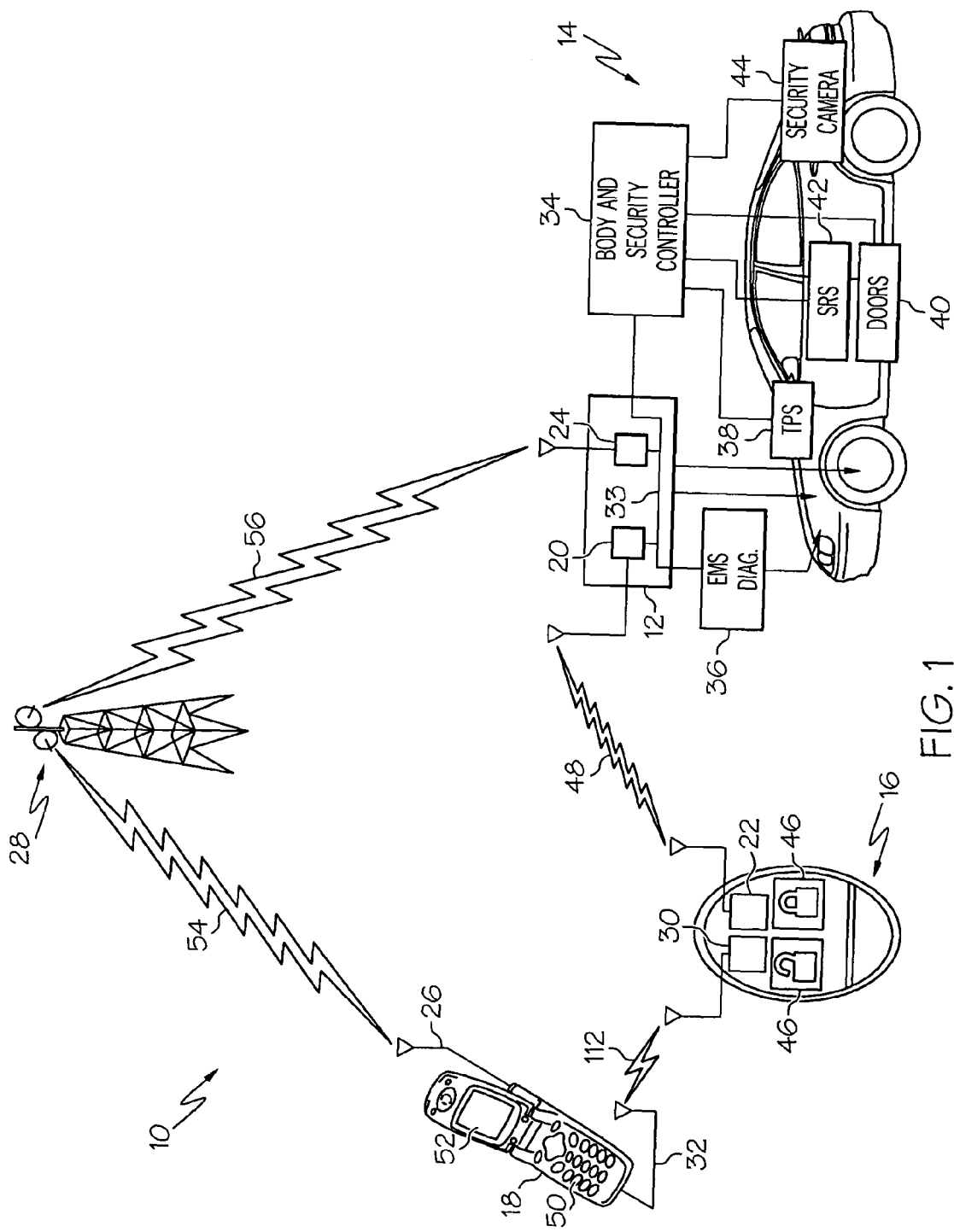
FIG. 1 is a diagram of a fault tolerant vehicle information and control system according to this invention, including a vehicle-installed telematics unit, a wireless fob and a wireless nomadic device.

Referring to the drawings, and particularly to FIG. 1, the reference numeral 10 generally designates a fault tolerant vehicle information and control system including a wireless telematics unit 12 installed in vehicle 14, a user-carried wireless portable fob 16, and a user-carried nomadic personal communication device 18 such as a cell phone or PDA (referred to herein simply as nomadic device 18). In general, the system 10 is configured to support both medium-range RF communications and global network communications between telematics unit 12 and the user-carried fob 16 and nomadic device 18. Communications between nomadic device 18 and telematics unit 12 can be relayed through the fob 16, and communications between fob 16 and telematics unit 12 can be relayed through nomadic device 18. Medium-range RF communications are supported by medium-range RF transceivers 20 and 22 in telematics unit 12 and fob 16, respectively; global network communications are supported by network transceivers 24 and 26 in telematics unit 12 and nomadic device 18, respectively, and a cellular antenna (or satellite) network 28; and relay communications are supported by short-range transceivers 30 and 32 in fob 16 and nomadic device 18. The short-range transceivers 30 and 32 may be Bluetooth IEEE 802.11 g/b/a/n, Near Field Communication (NFC), WiFi, or WiMax, for example.

Within vehicle 14, a communication bus 33 couples the transceivers 20 and 24 of telematics unit 12 to both a body and security controller 34 and an engine diagnostic system 36. The body and security controller 34 interfaces with various vehicle systems and actuators such as a tire pressure sensing system 38, door lock actuators 40, supplemental restraint system 42, and a security camera 44. The engine diagnostic system 36 interfaces with the vehicle engine (not shown) and stores engine diagnostic and maintenance data that can be supplied to nomadic device 18 when requested.

Fob 16 incorporates a conventional user interface, including depressible buttons 46 for signaling command functions such as door locking and unlocking, trunk unlatching, and alarm activation and deactivation. When a button 46 is depressed, the medium-range RF transceiver 22 within fob 16 establishes a bi-directional communication link with medium-range RF transceiver 20 within telematics unit 12 (as signified by the reference numeral 48) for authenticating the user and carrying out the corresponding command. Fob 16, telematics unit 12, and RF transceiver 22 can also constitute a passive entry system wherein the body and security controller 34 automatically locks or un-locks the vehicle doors via actuator 40 when the user-carried fob 16 crosses a prescribed distance threshold from the medium-range RF transceiver 20. Preferably, fob 16 additionally includes a programmed controller (not shown) coupled to the transceivers 22 and 30 for routing communications as explained below.

Nomadic device 18 is a conventional commercially-available cell phone or PDA, for example, that can be programmed with downloadable application software that regulates interactions between it, fob 16 and telematics unit 12. The keypad 50 and display 52 provide a useful and familiar human-machine interface for issuing vehicle commands and receiving vehicle data, obviating the need for similar interface elements on fob 16.

Communications between telematics unit 12 and nomadic device 18 can be initiated by telematics unit 12 or by the user of nomadic device 18. For example, the body and security controller 34 can be programmed to initiate a communication in response to the occurrence of a specified event such as high cabin temperature, a crash event, low tire pressure, unauthorized entry, low battery voltage, and so on. The communication uses the human machine interface of the nomadic device 18 to inform the user of the event, or to provide additional information including video and/or audio data from the vehicle 14. If network signal is not available, telematics unit 12 can be programmed to transmit the information to fob 16 via the medium-range RF transceivers 20 and 22, whereafter fob 16 will relay the information to nomadic device 18 via the short range wireless communication link 49. A remote user can initiate a communication, for example, by simply depressing a button on the nomadic device 18 or fob 16. The communication can be authenticated by the fob 16 (using a conventional rolling code, for example) or by the user (by entry of a PIN code or password, for example).

Figure 2A:
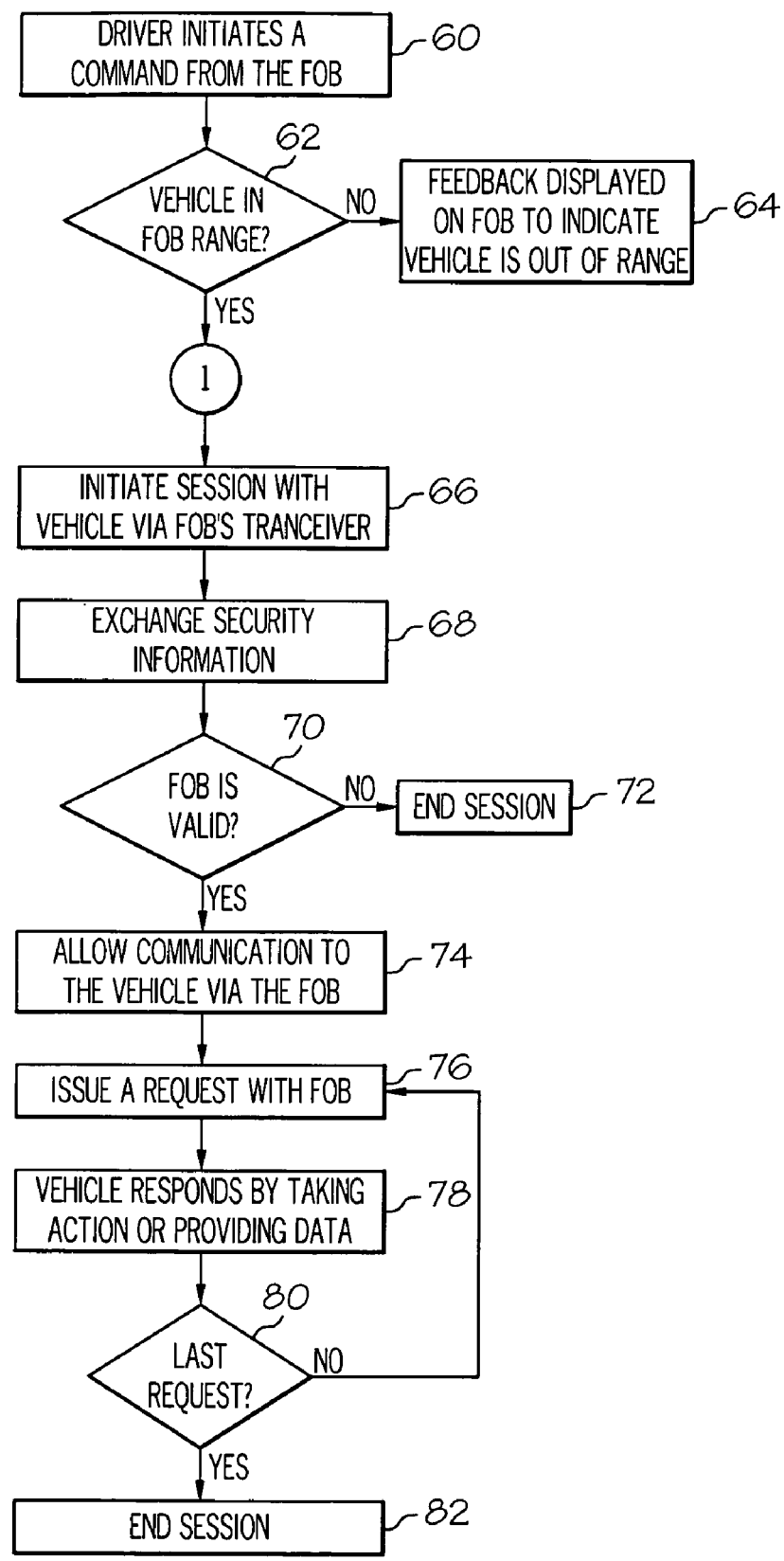
FIG. 2A is a flow diagram illustrating a communication sequence initiated by the wireless fob of FIG. 1, with manual path selection.
Figure 2B:
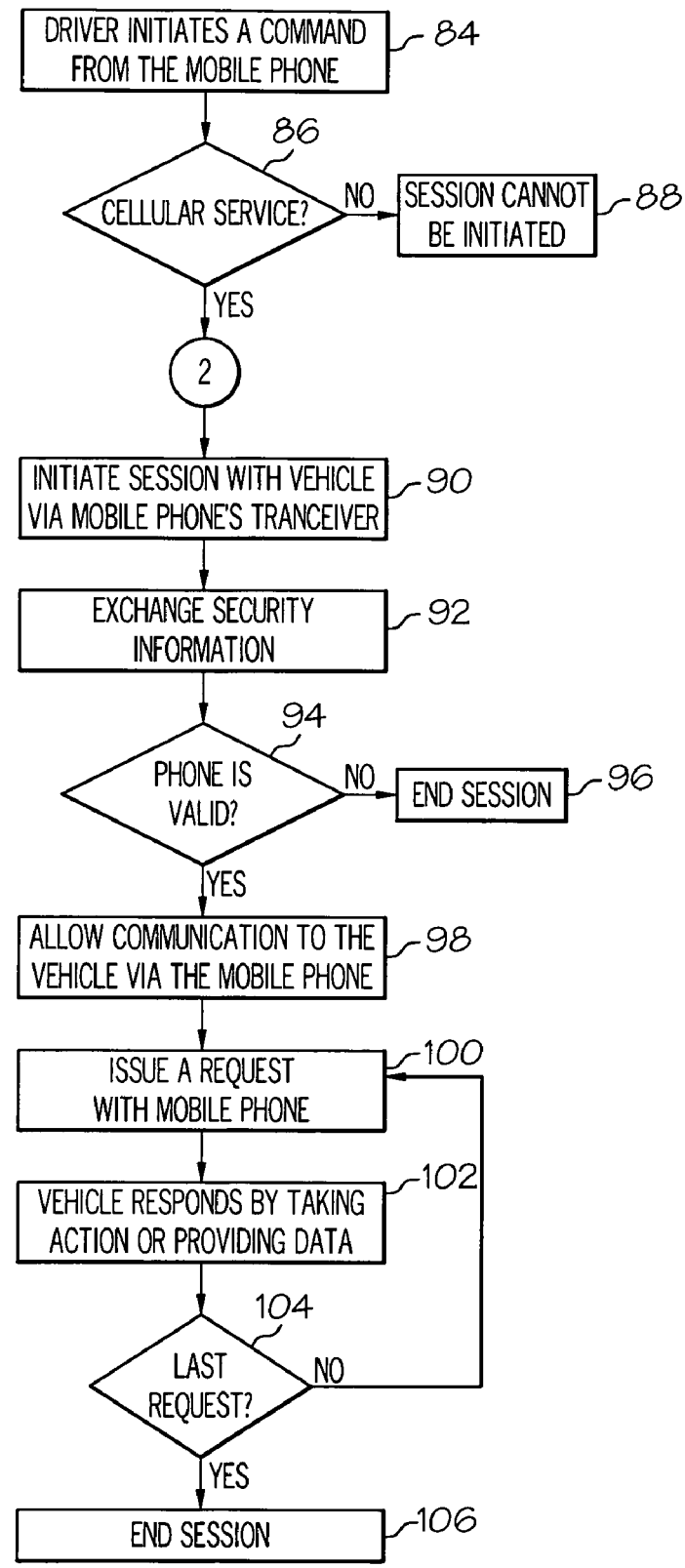
FIG. 2B is a flow diagram illustrating a communication sequence initiated by the wireless nomadic device of FIG. 1, with manual path selection.
Figure 2C:
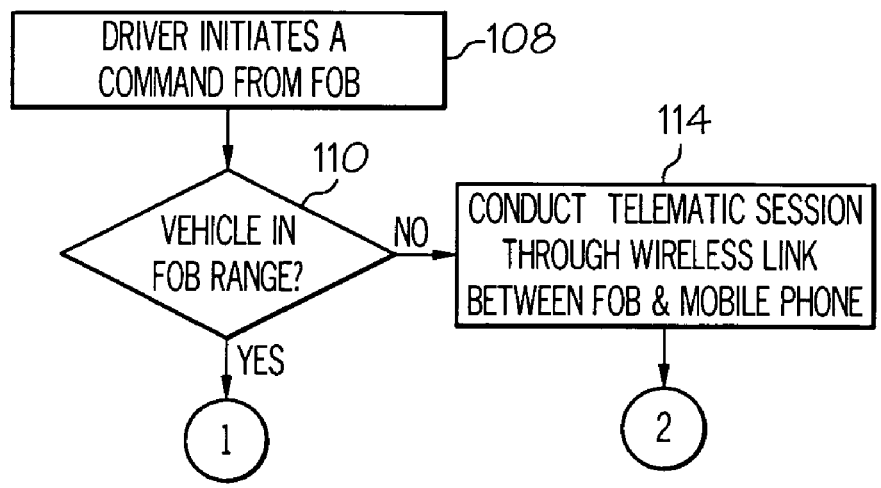
FIG. 2C is a flow diagram illustrating a communication sequence initiated by the wireless fob of FIG. 1, with automatic path selection.

The flow diagrams of FIGS. 2A-2D illustrate different user-initiated communication sequences. In FIG. 2A, the communication sequence is initiated from fob 16, with user path selection; and in FIG. 2B, the communication sequence is initiated from nomadic device 18, with user path selection. User path selection in this sense means that the user selects the communication path—by medium-range RF communication link 48 if fob 16 is used to initiate the communication, and by the global network communication link 54, 56 if nomadic device 18 is used to initiate the communication. In FIG. 2C, the communication sequence is initiated from fob 16, with automatic path selection; and in FIG. 2D, the communication sequence is initiated from nomadic device 18, with automatic path selection. Automatic path selection means that an alternate communication path is automatically established (if possible) when the user selected communication path is not available.

In the communication sequence of FIG. 2A, the user initiates a command from fob 16, such as a door locking command, as indicated by block 60. At block 62, fob 16 determines if the vehicle 14 is within range for RF communication. If not, fob 16 provides an out-of-range signal to the user, as designated by block 64; this may be a visual or audible signal, depending on how fob 16 is equipped. If the vehicle 14 is in RF range, fob 16 proceeds to initiate a communication session via RF transceiver 22, and exchanges security information with the RF transceiver 20 of telematics unit 12, as indicated by blocks 66 and 68. Telematics unit 12 then tests the validity of fob 16, as designated by block 70. If fob 16 is deemed to be invalid, telematics unit 12 ends the session as indicated at block 72. If fob 16 is deemed to be valid, telematics unit 12 allows the communication to proceed and appropriately responds to the fob-initiated request or command, as indicated at blocks 74, 76 and 78. As indicated at block 80, the communication session can include more than one request or command, such as commands to lock doors and close windows, for example. When the last request has been processed, the communication session is ended as indicated at block 82.

The communication sequence of FIG. 2B is user-initiated via nomadic device 18, as indicated at block 84. In this case, the nomadic device 18 first determines if network service is available, as indicated at block 86. If not, nomadic device 18 provides a "no-signal" indication to the user, as designated at block 88. If network service is available, nomadic device 18 proceeds to initiate a network communication session to the network transceiver 24 of telematics unit 12. The ensuing network communication sequence signified by blocks 90, 92, 94, 96, 98, 100, 102, 104 and 106 parallels the corresponding RF communication sequence of FIG. 2A, and is not described again here.

The flow diagram of FIG. 2C shows a preferred implementation of the fob-initiated communication sequence. Hence, blocks 108 and 110 of FIG. 2C respectively correspond to blocks 60 and 62 of FIG. 2A. Only here, if fob 16 determines that the vehicle 14 is out of range for RF communication, fob 16 signals nomadic device 18 via the short-range communication link 112 to initiate a network communication with transceiver 24 of telematics unit 12, as indicated by block 114. In other words, fob 16 uses nomadic device 18 to relay the fob-initiated request or command to telematics unit 12. Thus, the communication sequence proceeds to block 90 of FIG. 2B, as indicated by the circled numeral two in FIG. 2C and the corresponding circled numeral two in FIG. 2B.

Figure 2D:
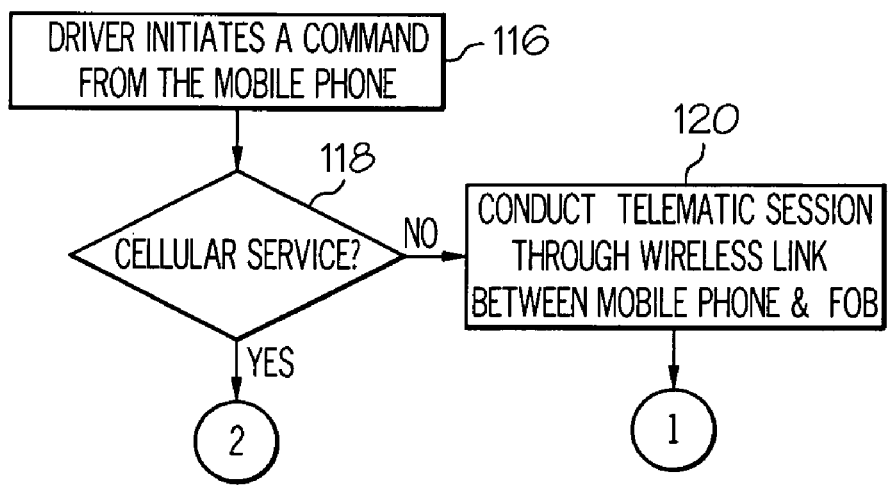
FIG. 2D is a flow diagram illustrating a communication sequence initiated by the wireless nomadic device of FIG. 1, with automatic path selection.

Finally, the flow diagram of FIG. 2D shows a preferred implementation of the nomadic device initiated communication sequence. Hence, blocks 116 and 118 of FIG. 2D respectively correspond to blocks 84 and 86 of FIG. 2B. Only here, if nomadic device 18 determines that there is no network signal, nomadic device 18 signals fob 16 via the short-range communication link 112 to initiate a RF communication with transceiver 20 of telematics unit 12, as indicated by block 120. In other words, nomadic device 18 uses fob 16 to relay the nomadic device initiated request or command to telematics unit 12. Thus, the communication sequence proceeds to block 66 of FIG. 2A, as indicated by the circled numeral one in FIG. 2D and the corresponding circled numeral one in FIG. 2A.

The above-described system 10 has a fault tolerant character in that there are different options for initiating vehicle information and control communications. For example, if the user misplaces fob 16, or its internal battery fails, vehicle information and control communications can still be initiated using nomadic device 18, and vice versa. Also, the system 10 may be configured to provide different levels of functionality. For example, while the automatic path selection described in reference to FIGS. 2C-2D is preferred, an advantage to the manual path selection option of FIGS. 2A-2B is that the nomadic device 18 requires no modifications, as described in the aforementioned U.S. patent application Ser. No. 12/150,872. Moreover, it is possible to configure the system 10 for automatic path selection for fob-initiated communications, but not nomadic device initiated communications, or vice versa, if desired. Many other variations are also possible, and it is intended that the invention not be limited to the disclosed embodiment, but that it have the full scope permitted by the language of the following claims.

The invention claimed is:

1. Information and control apparatus for a vehicle, comprising:
   a vehicle-installed telematics unit including a first wireless network transceiver and a first medium-range RF transceiver;
   a nomadic device carried by a vehicle user, including a second wireless network transceiver for communicating with the telematics unit via a global network, and a first short-range wireless transceiver; and
   a fob carried by the vehicle user including a second medium-range RF transceiver for communicating with the telematics unit, and a second short-range wireless transceiver for communicating with the nomadic device; where
   the user selectively initiates a vehicle information request or command communication using the fob and the first and second medium-range RF transceivers, and the nomadic device using the global network and the first and second wireless network transceivers.

2. The information and control apparatus of claim 1, where:
   said nomadic device includes control means effective when the user uses the nomadic device to initiate a vehicle information request or command communication and the global network is unavailable for communicating the vehicle information request or command to the fob via the first and second short-range wireless transceivers.

3. The information and control apparatus of claim 2, where:
   said fob includes control means for receiving a vehicle information request or command communicated from said nomadic device via the first and second short-range wireless transceivers, and relaying the received vehicle information request or command to the telematics unit via the first and second medium-range RF transceivers.

4. The information and control apparatus of claim 1, where:
   said fob includes control means effective when the user uses the fob to initiate a vehicle information request or command communication and the fob is not within an RF range of the telematics unit for communicating the vehicle information request or command to the nomadic device via the first and second short-range wireless transceivers.

5. The information and control apparatus of claim 4, where:
   said nomadic device includes control means for receiving a vehicle information request or command communicated from said fob via the first and second short-range wireless transceivers, and relaying the received vehicle information request or command to the telematics unit via the first and second wireless network transceivers.

* * * * *